Jan. 18, 1966     W. B. HAMELINK     3,229,536
CONTROLLABLE COUPLING
Filed April 27, 1964     2 Sheets-Sheet 1
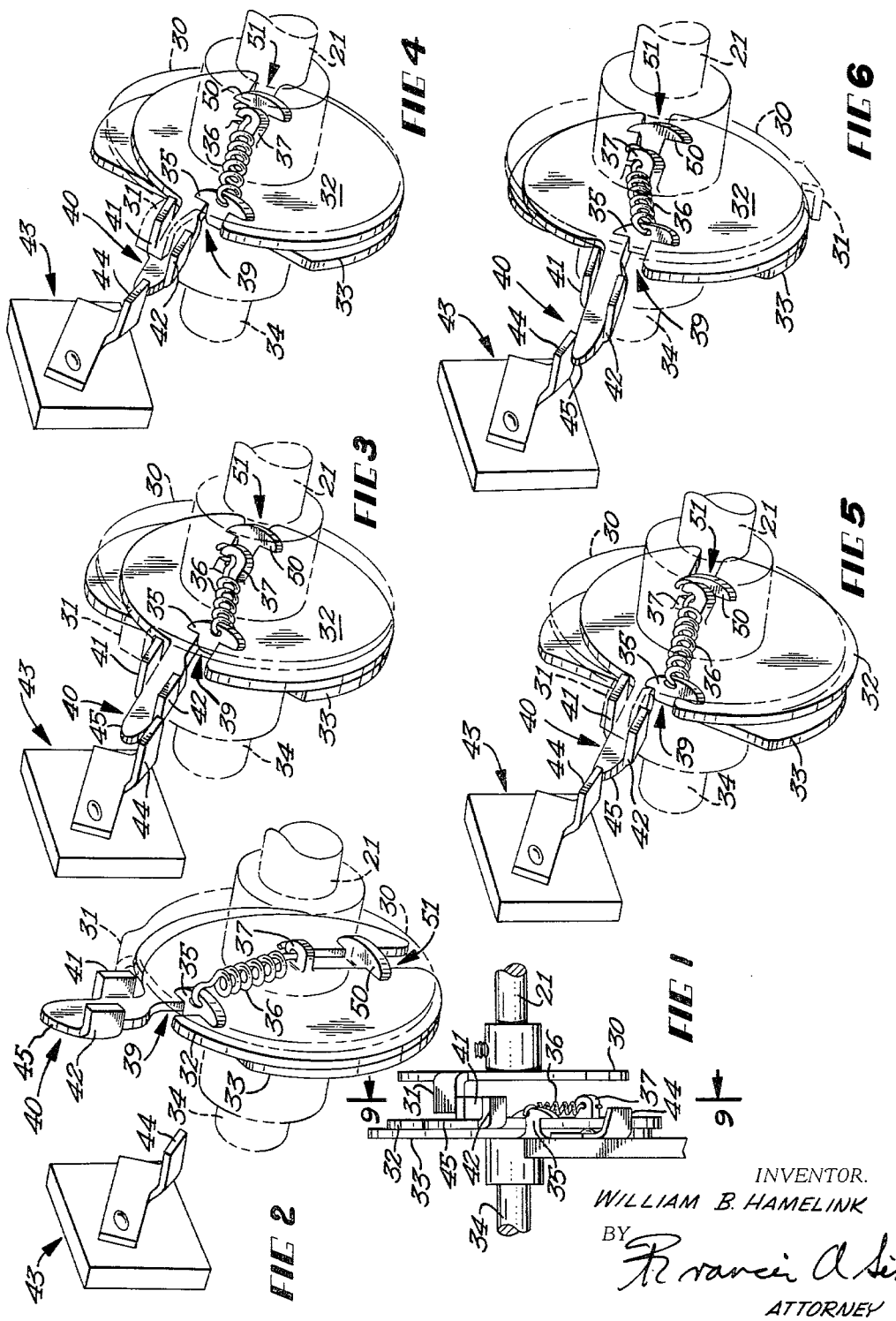
INVENTOR.
WILLIAM B. HAMELINK
BY
ATTORNEY

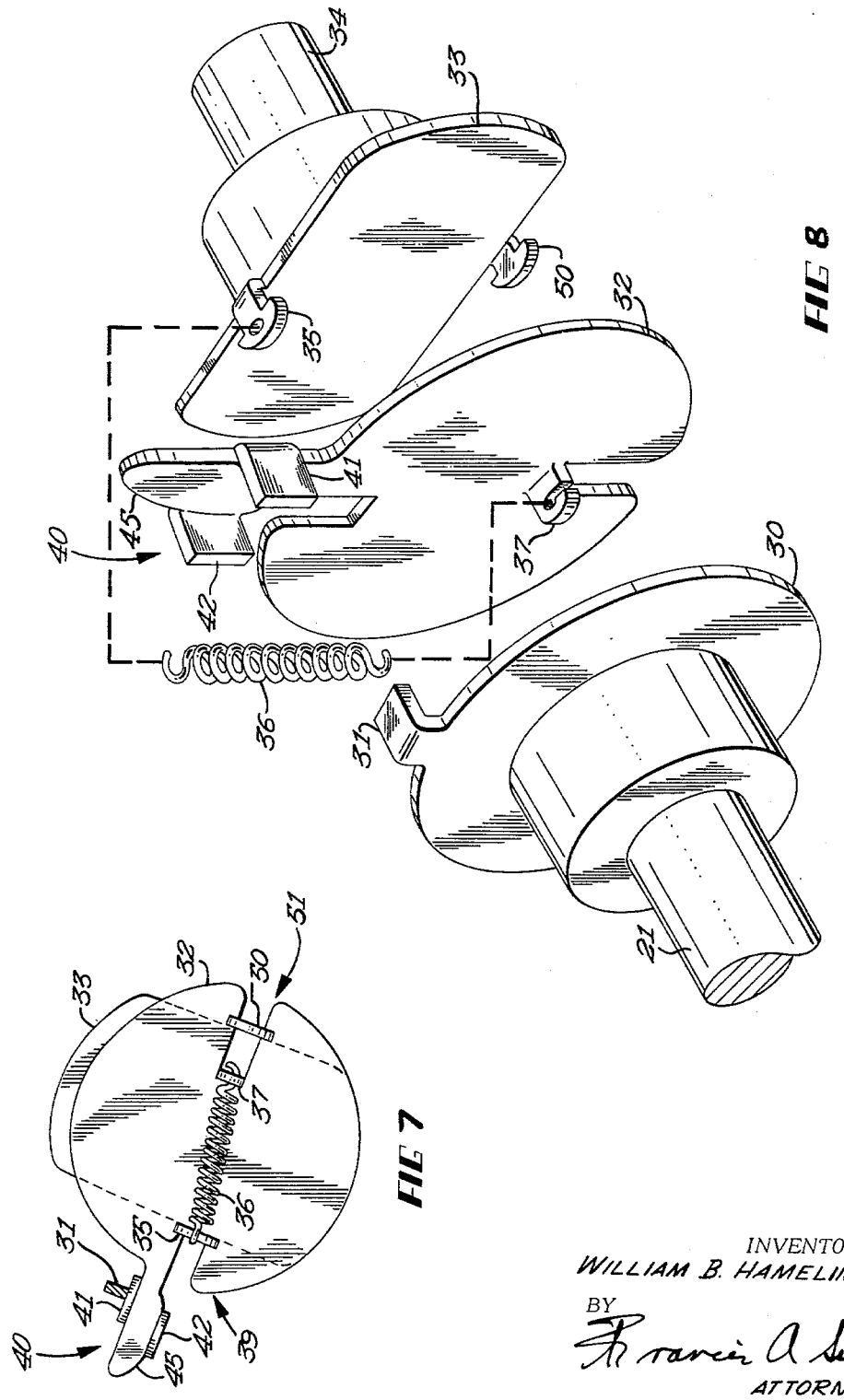

United States Patent Office 3,229,536
Patented Jan. 18, 1966

3,229,536
CONTROLLABLE COUPLING
William B. Hamelink, Minneapolis, Minn., assignor to Honeywell Inc., a corporation of Delaware
Filed Apr. 27, 1964, Ser. No. 362,707
6 Claims. (Cl. 74—125.5)

The present invention is concerned with an improved coupling and particularly with a coupling which is constructed and arranged to provide interrupted operation at a particular point in the drive.

I provide an input shaft which is axially aligned with an output shaft and which supports at least one drive dog radially spaced from the axis of the input shaft and the output shaft. The drive dog is adapted to engage a similarly located dog carried by the output shaft. This similarly located dog is spring biased to normally be engaged by the drive dog. As rotation of the input shaft and the output shaft continue to a given angular position, a stationary stop member is engaged by means including the dog carried by the output shaft. As a result, this dog is radially moved out of engagement with the drive dog and the drive dog passes on to engage a second dog which has been moved into engaging position. Thus, the input shaft continues to rotate, carrying with it the output shaft. After a small additional movement, the second drive dog is released and moved out of engagement with the drive dog, allowing the input shaft to continue rotating until the drive dog is again brought into engagement with the first mentioned dog carried by the output shaft. This additional rotation of the input shaft, while the output shaft remains stationary, has the effect of interrupting the drive.

FIGURE 1 is a side view of the controllable coupling which couples the input shaft to the output shaft, FIGURES 2 through 6 are perspective views showing progressive positions of rotation and the manner in which the controllable coupling is controlled by a stationary stop member, FIGURE 7 is a section view of the coupling of FIGURE 1, and FIGURE 8 is an exploded perspective view of the controllable coupling.

In FIGURE 1, I have shown input shaft 21 carrying a plate 30 including a drive dog 31. Shaft 21 rotates in a counterclockwise direction as viewed from the position of shaft 21 in FIGURE 1.

The drive dog of plate 30 is spaced at a given radial distance from the axis of rotation defined by shaft 21. A spring biased plate 32 is carried by a mechanism including a plate 33 which is integral with output shaft 34. This plate 33 includes a tab 35 which is connected by means of a spring 36 to a tab 37 formed in the spring biased plate 32. Plate 32 is thus radially movable in a direction which is transverse the axis of shafts 21 and 34, the plate 32 being provided with guide slots 38 and 51 cooperating with guide tabs 35 and 50.

In its normal spring biased position, plate 32 is biased to a position where tab 35 is bottomed in slot 39 and thus an extending portion 40 of plate 32 is positioned such that a first dog 41 is spaced at the same radial distance from the axis defined by shafts 21 and 34 as is drive dog 31. The portion 40 of plate 32 includes a second dog 42 which is spaced at a greater radial distance than is dog 41.

Reference numeral 43 designates a stop member including a portion 44 which is adapted to cooperate with a cam surface 45 formed on the portion 40 of plate 32.

The position of the coupling as shown in FIGURE 2 represents a zero time position. Shaft 21 rotates in a counterclockwise direction as shown in FIGURE 2 to drive the output shaft 34 by virtue of the coupling of dogs 31 and 41.

FIGURE 3 shows the coupling advanced to a position to cause the cam surface 45 to engage member 44.

In FIGURE 4, input shaft 21 has additionally rotated a slight amount and has caused the spring biased plate 32 to move in a downward direction, sliding within the guides 39 and 51 as guided by the tabs 35 and 50, until the first dog 41 is moved inwardly a distance so as to move it out of radial cooperating engagement with drive dog 31. Drive dog 31 then continues on and is shown as partially passing over the dog 41. During this portion of the rotation, as drive dog 31 passes over dog 41, output shaft 34 remains stationary.

In FIGURE 5 I have shown the position of the coupling as the input shaft 21 has rotated an additional amount from that shown in FIGURE 4 such that the drive dog 31 engages the second dog 42. The input shaft 21 is now again coupled to output shaft 34.

By virtue of this coupling, the spring biased plate 32, and thus the plate 33 carried by the output shaft 34, is driven an additional amount so as to release cam surface 45 from member 44. The spring 36 is then effective to restore the first dog 41 to the radial position as shown in FIGURE 2. At this time the drive dog 31 lies behind dog 41 and the second dog 42 has moved outwardly, out of engagement with drive dog 31. Thus, drive dog 31 and input shaft 21 continue to rotate in a counterclockwise direction while the output shaft 34 remains stationary. In FIGURE 6 I have shown the drive dog 31 as having passed a substantial distance beyond the dogs 41 and 42.

As rotation of input shaft 21 continues, the drive dog 31 returns to a position where it again engages dog 41 formed in plate 32. When this occurs, the shafts 21 and 34 are again coupled and the drive continues.

I have elected, for purposes of simplicity, to show a plate 30 carrying a single drive dog 31. I have also elected to show a single stop member 43. It will, however, be appreciated that plate 30 can be constructed to carry more than one drive dog 31 and to, in this manner, become coupled to dog 41 of plate 32 after only a portion of the full rotation of plate 30, thus giving a shorter period of drive interruption between shafts 21 and 34. For example, with reference to FIGURE 6, plate 32 could carry a second drive dog positioned to engage dog 41 as plate 32 reaches the angular position of FIGURE 6.

Also, a number of stop members could be angularly spaced about the axis of shafts 21 and 34 to be sequentially engaged by cam 45 and to thus cause a number of uncouplings of shafts 21 and 34 for a single rotation of shaft 21. This construction would provide the effect of a larger period of drive interruption.

I claim as my invention:
1. In combination;
    an input shaft and an output shaft having end portions mounted in axial alignment,
    drive means mounted on the end portion of said input shaft and including dog means radially spaced a given distance from the axis of said input shaft,
    driven means mounted on the end portion of said output shaft and arranged to be driven by said drive means, said driven means including radially movable dog means having first and second dogs which are angularly spaced from each other and which are radially spaced at unequal distances from the axis of said output shaft, said dog means being biased to a first position wherein one of said dogs is at said given radial distance from the axis of said output shaft to thus mate with the dog means of said drive means,
    and control means mounted to engage said driven means at a predetermined angular position to radially move said dog means to release said one of said dogs from driving engagement with the dog means of said drive means, and to move the other of said dogs into driving engagement, whereupon additional angular movement of said driven means causes said other of said dogs to be released and thus momentarily uncouples said driven means from said drive means.

2. In combination;
a first and a second shaft mounted in alignment along an axis and having mating end portions adapted to be coupled such that rotation of one shaft causes rotation of the other shaft,
a first abutment mounted to rotate with the end portion of said one shaft and radially spaced a given distance from said axis,
spring biased means including a second abutment mounted for radial movement and for rotation with the end portion of said other shaft, said second abutment being normally biased to a position which is said given distance from said axis, said first and second abutments thereby coupling said shafts,
a fixed control member mounted to engage said spring biased means and to radially move said second abutment out of engagement with said first abutment at a given angular position of said shafts,
and means for effecting a momentary continued rotation of said other shaft which is sufficient to cause said spring biased means to be disengaged from said fixed control member, whereupon said spring biased means returns to said normal position to be subsequently engaged by said first abutment due to continued rotation of said one shaft as said other shaft remains stationary.

3. In combination;
a drive member rotatable about an axis and having a drive dog spaced a given distance radially from said axis,
a driven member rotatable about said axis and having a first and a second radially spaced dog, said first dog being radially spaced said given distance from said axis and said second dog being radially spaced an additional distance from said axis, said first dog normally engaging said drive dog to thereby couple said drive member and said driven member,
and a control member positioned to be engaged by said driven member and when so engaged to move said driven member radially to thereby release said first dog from said drive dog and to cause said drive dog to engage said second dog, whereupon continued rotation of said driven member causes said driven member to be released by said control member to cause the release of said second dog from said drive dog.

4. In combination;
a drive shaft,
a further shaft mounted in axial alignment with said drive shaft,
a drive dog fixed to said drive shaft and radially spaced a given distance from the axis thereof to rotate as said drive shaft rotates,
a first and a second dog fixed to said further shaft, said first dog being radially spaced said given distance from the axis of said further shaft to normally engage said drive dog, said second dog being angularly spaced from said first dog in the direction of rotation of said drive shaft and being radially spaced from said first dog,
and a control member adapted to engage means including said first and second dogs to radially move said dogs, causing said first dog to move out of engagement with said drive dog, whereupon additional rotation of said drive dog causes said drive dog to engage said second dog to continue rotation of said further shaft to an angular position beyond said control member, whereupon said second dog moves out of engagement with said drive dog and said drive shaft then continues to rotate as said further shaft remains stationary.

5. In combination;
a drive shaft,
an output shaft mounted in axial alignment with said drive shaft,
first cooperating abutment means having a first abutment mounted on said drive shaft and spaced a given radial distance therefrom, and having a second abutment mounted for radial movement on said output shaft, and biased to normally be positioned at said given radial distance therefrom, said first abutment means coupling said drive shaft to said output shaft,
a third abutment mounted for radial movement on said output shaft and biased to normally be radially spaced from said second abutment,
a control member mounted at an angular position in relation to the angular position of said output shaft and including means operative to radially move said second and third abutments such that said third abutment is moved to said given radial distance as said second abutment is moved out of engagement with said first abutment,
and second cooperating abutment means formed by said first and third abutments to couple said drive shaft to said output shaft to continue rotation of the shafts beyond said fixed angular position, resulting in a return of said second and third abutments to the original position, whereupon said output shaft is temporarily uncoupled from said input shaft.

6. In combination;
a first shaft,
a second shaft,
a drive member mounted on said first shaft and including a drive tab which is radially spaced a fixed distance from the axis of said first shaft,
a spring biased plate mounted on said second shaft to be driven by said drive member and including a first and a second tab which are angularly separated and are radially spaced at unequal distances from the axis of said second shaft, said plate normally assuming a first position where said first tab is positioned at said fixed distance and being movable to a second position where said second tab is positioned at said fixed distance,
and a control member operative to engage said plate to move the same from said first to said second position, whereupon said drive member is momentarily uncoupled from said plate.

References Cited by the Examiner

UNITED STATES PATENTS

| | | | |
|---|---|---|---|
| 1,830,004 | 11/1931 | Skoverski | 74—125.5 |
| 2,191,540 | 2/1940 | Poole | 74—112 |
| 2,737,278 | 3/1956 | Bartelt | 74—125.5 |
| 2,855,785 | 10/1958 | Rutishauser | 74—125.5 |
| 3,136,168 | 6/1964 | Matovich | 74—125.5 |

BROUGHTON G. DURHAM, *Primary Examiner.*

JONATHAN A. MARSHALL, *Assistant Examiner.*